United States Patent [19]

Bendtsen

[11] 4,011,957

[45] Mar. 15, 1977

[54] FOLDING EJECTOR LINKAGE FOR MATERIAL HANDLING MACHINERY

[75] Inventor: Randall R. Bendtsen, Peoria, Ill.

[73] Assignee: Caterpillar Tractor Co., Peoria, Ill.

[22] Filed: Jan. 16, 1976

[21] Appl. No.: 649,874

[52] U.S. Cl. .................................. 214/82; 100/295
[51] Int. Cl.² ......................................... B60P 1/00
[58] Field of Search ........... 214/82, 83.3, 510, 514, 214/26, 146 E, 83.24; 100/295

[56] References Cited
UNITED STATES PATENTS

| | | | |
|---|---|---|---|
| 2,934,226 | 4/1960 | Dempster et al. | 214/82 |
| 3,349,931 | 10/1967 | Wagner | 214/82 |

*Primary Examiner*—Robert G. Sheridan
*Attorney, Agent, or Firm*—Phillips, Moore, Weissenberger, Lempio & Majestic

[57] ABSTRACT

An ejector assembly for a material handling vehicle of a type having a bowl or container formed by a relatively fixed container portion and a movable container portion, the movable container element being retractable into a nested position within the fixed container portion for receiving material therein, the movable container portion being movable through the fixed portion to initially remove material therefrom, an ejector assembly including an extendable and retractable jack having a folding link pivotably connected thereto, the jack and folding link being pivotably interconnected between the fixed and movable portions for extension toward a parallel alignment and into engagement with an ejector in order to condition the jack for subsequently operating the ejector to complete removal of material from the bowl.

26 Claims, 9 Drawing Figures

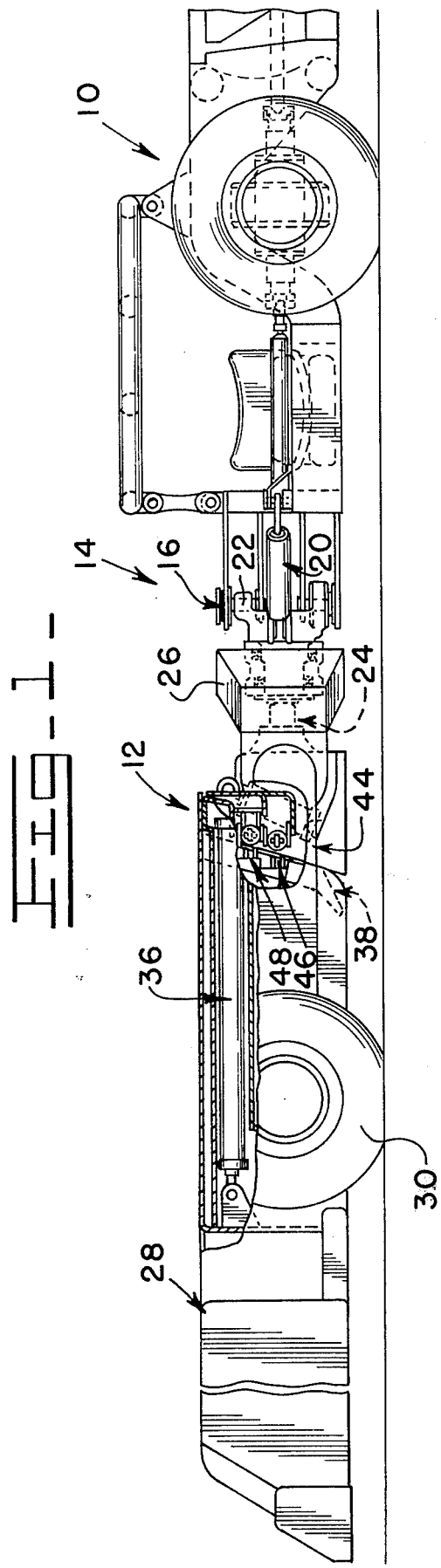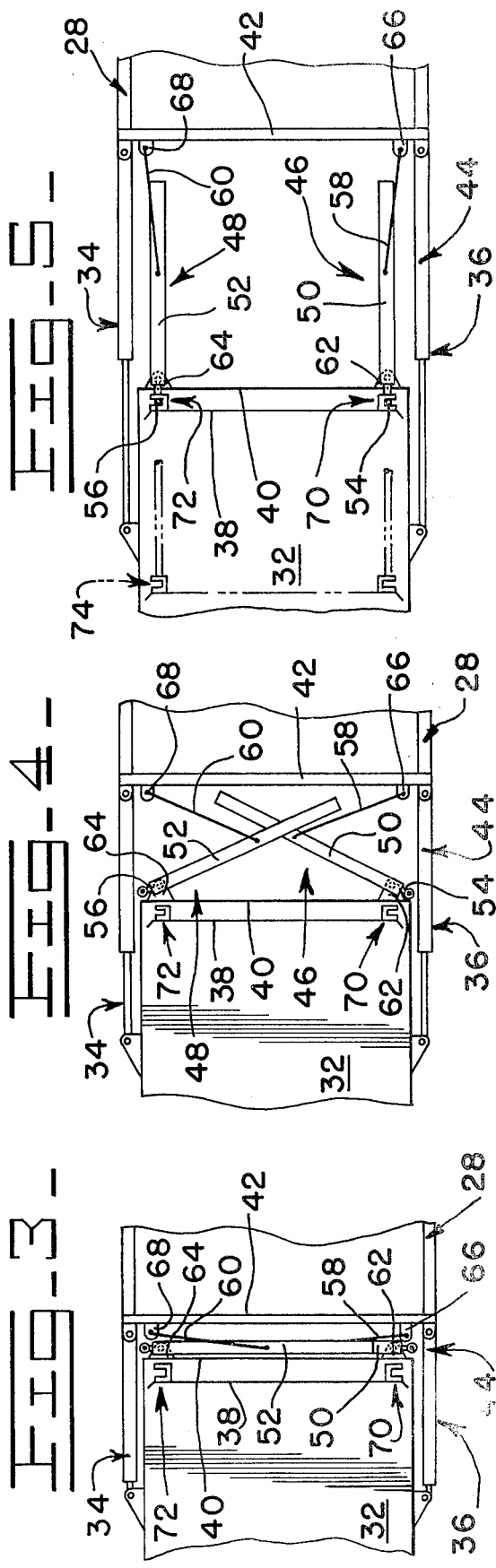

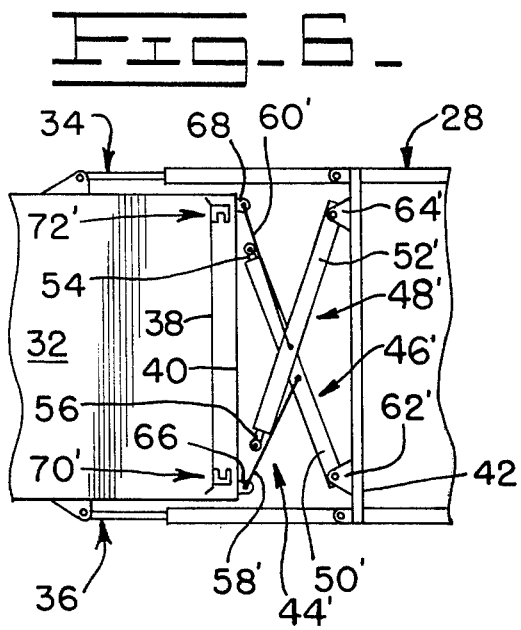
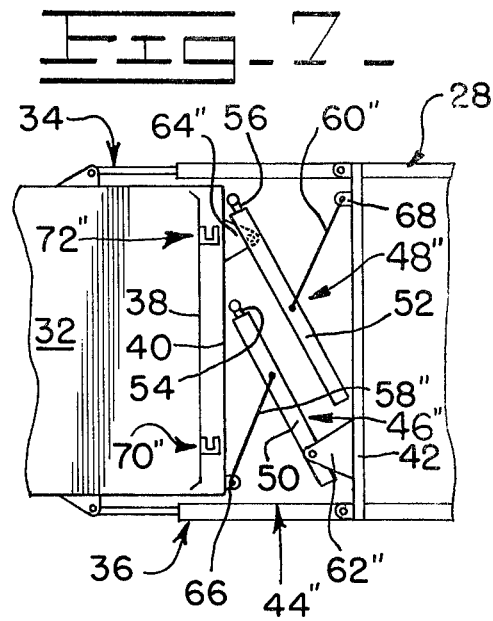
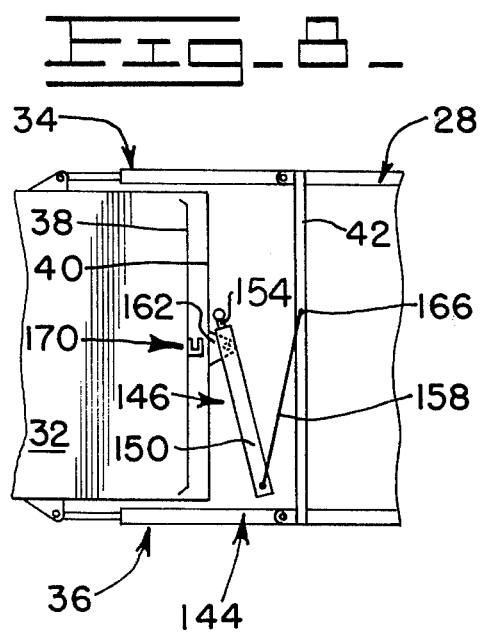
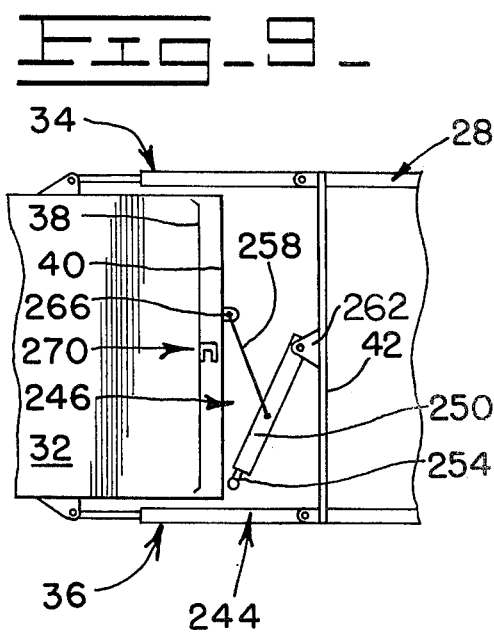

FOLDING EJECTOR LINKAGE FOR MATERIAL HANDLING MACHINERY

BACKGROUND OF THE INVENTION

The present invention is directed toward a folding linkage arrangement for an ejector in a material handling machine wherein a jack is conditioned for operation of the ejector by initial relative movement of two portions in the machine, the jack thereafter being arranged for operating the ejector. More generally, the invention is directed toward such a folding linkage arrangement wherein movement of a powered element under the influence of the jack is to occur subsequent to initial movement between two other elements.

Within the following description, the invention is specifically described in connection with a hauling vehicle of a type adapted for operation in mines to move coal or other minerals, for example. Within such an environment, it is desirable that the vehicle be as compact as possible. For this reason, the hauling vehicle described below is particularly contemplated as having a bowl or container element formed from a pair of telescoping container portions. The inner portion may then be extended through the outer portion to initially unload material therefrom. Within such a combination, the present invention is particularly directed toward an ejector assembly which is operable subsequent to the initial movement between the two container portions as described below in order to complete the removal of the material from the bowl.

It is of course well known to employ ejectors for removing a load from material handling machines. In most such arrangements, the jacks or other motor means which extend and retract to operate the ejectors tend to remain in fixed alignment upon the material handling machine.

In certain other prior art arrangements, the actuating jacks may tend to be pivoted into a different operating alignment but in such prior art combinations, the rotation or movement of the jacks tends to occur only as a function of the jacks extending or retracting to operate a powered element.

Accordingly, there has been found to remain a need for a jack arrangement in material handling machinery wherein the jack may be compactly contained with its operation being subsequent to initial movement between other portions of the material handling machine.

SUMMARY OF THE INVENTION

Accordingly, it is an object of the present invention to provide such a jack arrangement for operating ejectors or other powered elements within material handling machinery.

It is a more specific object of the invention to provide a folding jack and linkage arrangement for use within hauling vehicles of a type having relatively movable bowl portions with the jack being conditioned for operation subsequent to initial relative movement between the bowl portions.

It is yet another object of the invention to provide a folding jack and linkage assembly for use within material handling machinery wherein the jack and a folding link pivotably connected therewith are also interconnected respectively with relatively movable portions of the machine in order to condition the jack for operation subsequent to initial movement of the relatively movable machine portions.

It is an even more specific object of the invention to provide such a jack arrangement wherein the jack and folding link, which is preferably a rigid, elongated member, remain in a slightly angled configuration relative to each other in order to prevent overcenter movement of the jack and link combination.

Additional objects and advantages of the invention are made apparent in the following description having reference to the accompanying drawings.

BRIEF DESCRIPTION OF THE DRAWINGS

FIG. 1 is a side view in elevation, with parts in section, of a hauling vehicle of the type contemplated as a preferred setting for the present invention.

FIGS. 3, 4 and 5 are fragmentary top views of a portion of the hauling vehicle of FIGS. 1 and 2, with some parts being illustrated in schematic form to better illustrate the folding jack and linkage arrangement of the present invention. These three figures illustrate sequential positions assumed by the folding jacks and linkage arrangement during relative movement between portions of the bowl for the hauling vehicle.

FIGS. 6 and 7 are respectively similar views as FIG. 4 while representing alternate embodiments including a pair of extendable and retractable jacks.

FIGS. 8 and 9 are also additional views similar to FIG. 4 while respectively illustrating yet two more embodiments of the invention, each embodying a similar arrangement including a single jack.

DESCRIPTION OF THE PREFERRED EMBODIMENTS

Figure 2:
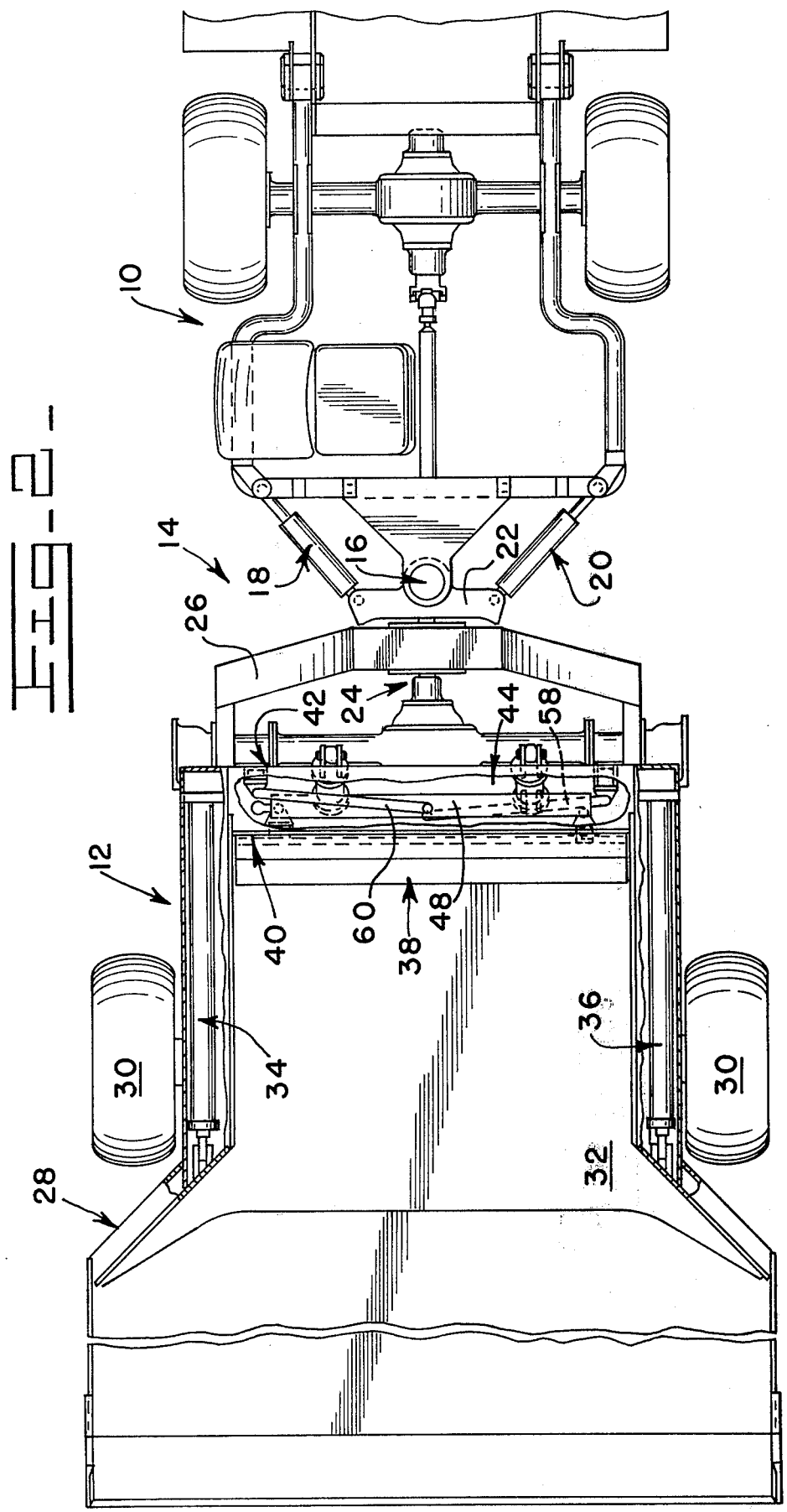
FIG. 2 is a top view, also with parts in section, of the hauling vehicle of FIG. 1.

As was also indicated above, the present invention is particularly directed toward a hauling vehicle of the type best seen, for example, in FIGS. 1 and 2. However, the folding jack and linkage arrangement of the present invention is also contemplated for use in other material handling vehicles, for example, in loaders having buckets equipped with ejectors. However, it will be particularly apparent from the following description that the folding jack arrangement of the present invention may be similarly employed to provide a compact configuration wherein the jack may be employed to operate an ejector or other powered element subsequent to initial movement between two relatively movable elements.

Referring now to FIGS. 1 and 2, the hauling vehicle illustrated therein includes a tractor unit 10 adapted for pulling a trailer unit 12. As indicated above, the present invention is primarily directed toward the construction of the bowl or container within the trailer unit 12. Accordingly, the overall construction of the hauling vehicle is set forth only briefly below with the major portion of the description being directed toward a telescoping construction of the bowl within the trailer 12.

The tractor 10 is particularly contemplated as being of a compact design for use within the limited confines or a mine or the like. The tractor 10 is coupled with the trailer 12 through a hitch assembly generally indicated at 14. The hitch assembly 14 includes a vertically arranged, pivotable coupling 16 which provides an axis of articulation within the hitch, steering being accomplished by a pair of jacks 18 and 20 which are conventionally interconnected between the tractor 10 and a portion 22 of the hitch assembly opposite the pivoted coupling 16.

The hitch assembly 14 also includes another horizontally arranged, pivoted coupling 24 providing an axis of oscillation between the tractor 10 and a drawbar or draft member 26 of the trailer unit 12.

The construction of the trailer unit 12 is important within the context of the present invention only to the extent that it includes an outer bowl portion 28 secured to the draft member 26 and supported by wheels 30. An inner bowl portion 32 is slidably or movably arranged within the outer bowl portion 28. A pair of hydraulic jacks 34 and 36 are interconnected between the bowl portions 28 and 32 in order to move the inner bowl portion 32 through the outer bowl portion 28 for unloading material therefrom or for retracting the inner bowl portion 32 into a nested position best seen in FIG. 2. The jacks 34 and 36 are arranged between respective walls of the bowl portions 28 and 32 in order to isolate the jacks from material loaded into the trailer.

Movement of the inner bowl portion 32 is a leftward direction from its position illustrated in FIG. 2 is not sufficient to entirely unload material from the trailer. Accordingly, an ejector is arranged within the inner bowl portion 32 in order to sweep through the inner bowl portion 32 and entirely remove material therefrom during unloading. The present invention is specifically directed toward a jack and folding linkage mechanism for powering the ejector, which is a fabricated plate structure indicated at 38. The ejector 38 is preferably arranged just inside the rightward end of the inner bowl portion 32 when the jacks 34 and 36 are retracted to locate the inner bowl portion 32 in its nested position.

The present invention is specifically directed toward the design of the jack and folding linkage arrangement which permits a very compact configuration for the trailer unit 12 when the jacks 34 and 36 are retracted. The jack and folding linkage arrangement is also contemplated as being in an operable position following movement of the inner bowl portion 32 in a leftward direction as viewed in FIGS. 1 and 2, through the outer bowl portion 28. That relative movement between two bowl portions serves to initially unload material from the trailer. Accordingly, the jack and folding linkage arrangement is conditioned to subsequently operate for completely removing material from the trailer.

The specific arrangement of the jack and folding linkage arrangement is best illustrated in the subsequent figures. However, with continued reference to FIGS. 1 and 2, it may be seen that the inner bowl portion 32 has an end piece 40 which is spaced apart from an end portion 42 of the outer bowl portion 28 even when the jacks 34 and 36 are fully retracted. The space thus provided between the end pieces 40 and 42 for the two bowl portions contains the jack and folding linkage arrangement which is generally indicated at 44. The specific construction of the jack and linkage arrangement 44 is described in greater detail below having reference to the enlarged, fragmentary views of FIGS. 3–5.

Referring initially to FIG. 3, the inner bowl portion 32 is similarly illustrated in a fully retracted position within the outer bowl portion 28. FIG. 3 best illustrates the compact configuration possible for the jack and linkage arrangement 44 between the end pieces 40 and 42 for the two bowl portions 32 and 28, respectively. The actual configuration and arrangement of the jack and linkage components 44 may be better seen, however, in FIGS. 4 and 5. FIG. 4 illustrates the inner bowl portion 32 as being initially moved through the outer bowl portion 28 by the jacks 34 and 36. FIG. 5 illustrates generally maximum extension for the jacks 34 and 36 whereupon movement of the inner bowl portion 32 through the outer bowl portion 28 is completed.

Accordingly, the components and interconnections for the jack and linkage components are described immediately below with specific reference to FIGS. 4 and 5. However, numerical labels for these various components are also indicated in FIGS. 1–3 where possible.

The jack and linkage arrangement 44 includes a pair of hydraulic jacks 46 and 48 which comprise cylinders 50 and 52 with extendable and retractable rods 54 and 56 respectively. The cylinders 50 and 52 are pivotally connected to the end wall 40 of the inner or movable bowl portion 32 by means of trunnion mounts 62 and 64.

Folding links, in the form of rigid, elongated bars or straps as indicated at 58 and 60, are pivotably connected toward one end to the respective cylinders 50 and 52. The opposite ends of the links 58 and 60 are pivotably connected at 66 and 68 respectively, to the end wall of the fixed or outer bowl portion 28. The function of the folding links 58 and 60 might also be accomplished by other means, such as elongated coil springs, for example. However, the rigid elongated construction of the links is preferred in order to provide positive control over the position of the jacks 46 and 48 at all times.

The rods 54 and 56 for the two jacks are adapted at their ends to interconnect with brackets 70 and 72 which are mounted upon the rear of the ejector assembly 38. As may be best seen in FIG. 4, the brackets 70 and 72 have openings facing toward adjacent sides of the inner bowl portion 32. Accordingly, as the inner bowl portion 32 is shifted through the outer bowl portion 28 by extension of the jacks 34 and 36, the ends of the rods 54 and 56 rotate inwardly into engagement with the brackets.

The length of the cylinders 50, 52 and the links 58, 60 are selected so that the jacks engage the brackets 70 and 72 at generally the same time as the jacks 34 and 36 reach full extension. However, as may be seen in FIG. 5, each interconnected cylinder and link, as indicated respectively at 50, 58 or 52, 60, preferably remains in slightly angled relation even after full extension of the jacks 34 and 36 in order to prevent them from passing overcenter with respect to each other.

After the jacks 34 and 36 have been fully extended, the jacks 46 and 48 are engaged with the brackets 70 and may then be extended to sweep the ejector 38 through the inner bowl portion 32 toward a position illustrated in phantom in FIG. 5. The phantom position of the ejector and rods is generally indicated at 74.

The two pairs of jacks 46, 48 and 34, 36 may be operated in reverse in order to return both the ejector 38 and the inner bowl portion 32 into the fully nested positions illustrated in FIG. 2. Because of the arrangement of the jacks 46 and 48 together with their respective folding links 58 and 60, the entire jack and linkage arrangement 44 is repositioned within the compact configuration best seen in FIG. 3.

Additional embodiments with different jack and linkage arrangements are illustrated in FIGS. 6 and 7. The jack and linkage arrangements for those figures are respectively indicated at 44′ and 44″. The bowl portions and ejector are indicated by the same numerals employed above in FIGS. 1–5.

In FIG. 6, the cylinders 50' and 50' are pivotably connected by means of trunnion mounts 62' and 64' to the end wall 42 of the outer bowl portion 28. The links 58' and 60' are pivotably connected to the end wall 40 of the inner bowl portion 32. With this arrangement and upon movement of the inner bowl portion 32 through the outer bowl portion 28, the rod ends of the two jacks 46' and 48' rotate outwardly toward the respective brackets 70' and 72'. Accordingly, the brackets 70' and 72' in FIG. 6 face inwardly to assure their engagement with the respective jacks.

The arrangement of FIG. 6 differs from the arrangement of FIG. 3–5 as described above in that operation of the jacks 46' and 48' tends to apply reaction force to the end wall 42 of the outer bowl portion 28 rather than the end wall 40 of the inner bowl portion 32.

The embodiment of FIG. 7 is a composite of the arrangements 44 and 44' described above. In the arrangement 44" of FIG. 7, the trunnion mounting 62" for the jack 46" is arranged upon the end wall 42 while the respective link 58" is pivotably connected to the end wall 40 for the movable bowl portion 32. The other jack 48" has its trunnion mounting 64" upon the end wall 40 while the respective link 60" is pivotably connected to the end wall 42. Because of this arrangement, the bracket 70" has an inwardly facing opening while the other bracket 72" has an outwardly facing opening.

Other than for the distinctions set forth above, the inner bowl portion 32 and the ejector 38 are similarly operated by the jacks 34, 36 and the jack and link arrangements 44' and 44" of FIGS. 6 and 7, respectively.

Two additional embodiments also with modified jack and link arrangements are also illustrated in FIGS. 8 and 9 where they are indicated at 144 and 244 respectively. Here again, the outer bowl, the inner bowl, the ejector and the two jacks for moving the inner bowl portion relative to the outer bowl portion are indicated by the same numerals employed above in FIGS. 1–7.

Referring first to FIG. 8, the jack and link arrangement 144 includes a single jack 146 including a cylinder 150 and a rod 154. The cylinder is pivotably connected by means of a trunnion mounting 162 to a central portion of the end wall 40 for the movable bowl portion 32. A single folding link 158 is pivotably connected at one end to the cylinder 150. The other end of the link 158 is pivotably connected to the end wall 42 at 166. A single bracket 170 is centrally mounted upon the ejector 38 with its opening being arrangement for engagement with the rod 154 of the jack 146.

In the arrangement 244 of FIG. 9, a single jack 246 includes a cylinder 250 and a rod 254. The cylinder is pivotably connected to the end wall 42 of the outer bowl portion 28 by the trunnion 262. A folding link 258 is pivotably connected at one end to the cylinder 250. The other end of the link 258 is pivotably connected at 266 to a central portion of the end wall 40 for the movable bowl portion 32. Here again, a single bracket 270 is centrally mounted upon the ejector 38 with its opening being arranged for engagement with the rod portion 254 of the jack 246.

Otherwise, the arrangements 144 and 244 of FIGS. 8 and 9, each including only a single jack and associated folding link, operate in substantially the same manner described above for the jack and linkage arrangement of FIGS. 1–5.

What is claimed is:

1. An ejector assembly for a hauling vehicle of a type having a relatively fixed container portion and a movable container portion, motor means being operable to move the movable container portion into a first position for forming an enclosure to receive a load, the motor means also being operable to move the movable container portion from its first position for unloading of the vehicle, the ejector assembly comprising
   an ejector element being arranged in a retracted position within the movable container portion in said first position.
   bracket means mounted upon the ejector element,
   jack means including an extendable and retractable component, and
   a folding link pivotably connected with the jack means,
   the jack means being pivotably connected with one container portion and the folding link being pivotably connected with the other container portion,
   the jack means and folding link being extended toward a parallel alignment with each other and the jack means entering into engagement with the bracket means as the movable container portion is moved from its first position relative to the fixed container portion, thereby conditioning the jack means to subsequently operate the ejector element for completing removal of the load from the vehicle.

2. The ejector assembly of claim 1 wherein the movable container portion is nested within the fixed container portion and has an end piece in spaced apart relation from an end piece of the fixed container portion in its first position, the ejector element then being arranged closely adjacent the end piece of the movable container portion, the jack means and folding link being arranged between and in parallel relation with the end pieces of the two container portions in said first position, movement of the movable container portion from its first position serving to initially unload material from the vehicle with the jack means and its folding link being thereby conditioned to subsequently complete removal of the load from the vehicle.

3. The ejector assembly of claim 2 further comprising an additional jack means and pivotably interconnected folding link, one combination of jack means and folding link being arranged for similar interconnection with the fixed container portion, the movable container portion and the ejector element upon opposite transverse sides thereof.

4. The ejector assembly of claim 3 wherein the two jack means are pivotably connected with the fixed container portion and the folding links are pivotably connected with the movable container portion.

5. The ejector assembly of claim 3 wherein the two jack means is pivotable connected with the movable container portion and the folding links are pivotably connected with the fixed container portion.

6. The ejector assembly of claim 3 wherein one jack means is pivotably connected with the fixed container portion and its movable link is pivotably connected with the movable container portion, the other jack means being pivotably connected with the movable container portion while its folding link is pivotably connected with the fixed container portion.

7. The ejector assembly of claim 1 wherein the jack means comprises at least one hydraulic jack having an extendable and retractable rod.

8. The ejector assembly of claim 7 wherein the folding link is pivotably connected to either the cylinder or rod component of the jack while also being pivotably connected with the fixed container portion, the other component of the hydraulic jack being pivotably connected with the movable container portion.

9. The ejector assembly of claim 7 wherein the jack means comprises a hydraulic jack including a cylinder and an extendable and retractable rod, the folding link being pivotably connected to either the cylinder or rod component of the jack and with the movable container portion, the other portion of the jack being pivotably connected with the fixed container portion.

10. The ejector assembly of claim 1 wherein the jack means and folding link remain in slightly angled relation to each other when the jack means engages the bracket means to prevent overcenter motion of the jack means and folding link.

11. The ejector assembly of claim 10 wherein the folding link is a rigid, elongated member and the jack means is a hydraulic jack having an extendable and retractable rod.

12. The ejector assembly of claim 1 wherein the folding link comprises a rigid elongated member pivotably connected generally at its ends with a portion of the jack means and one of the container elements respectively.

13. A material handling container adapted for receiving loose material such as earth, minerals or the like and for positively removing material therefrom, comprising a relatively fixed structural element,
another element forming a portion of the container and being movable relative to the structural element, the movable element having a first operating position suitable for the loading of material into the container, the movable element being movable from its first position for conditioning the container
motor means for effecting relative movement between the movable element and the fixed structural element,
an ejector element arranged within the container and having a retracted position therein when the movable element is in its first position,
jack means including an extendable and retractable element, and
a folding link pivotably connected with the jack means,
the jack means and folding link each being pivotably connected with one of the structural elements and movable container element respectively,
the jack means and folding link being extended toward a parallel alignment with each other as the movable container element is moved from its first position, a portion of the jack means thereupon entering into engagement with a bracket means mounted upon the ejector element thereby conditioning the jack means to subsequently operate the ejector element for completing removal of material from the container.

14. The container of claim 13 wherein the movable container element has an end piece arranged in spaced-apart relation from the structural element in its first position, the ejector element then being arranged closely adjacent the end piece of the movable container element, the jack means and folding link being arranged between the end piece of the movable container element and the structural element and in parallel relation with the end piece of the movable container element in its first position, movement of the movable container element away from its first position adjacent the structural element thereby conditioning the jack means and its folding link to subsequently remove material from the container.

15. The ejector assembly of claim 14 wherein the jack means comprises at least one hydraulic jack including a cylinder and an extendable and retractable rod, the folding link comprising a rigid, elongated member being pivotably connected generally at one end with one portion of the hydraulic jack.

16. The container of claim 13 wherein the jack means comprises a hydraulic jack including a cylinder and extendable and retractable rod, the folding link being pivotably connected with either the cylinder or rod portion of the jack and also with the structural element, the other portion of the hydraulic jack being pivotably connected with the movable container element.

17. The container of claim 16 wherein the folding link comprises a rigid, elongated member pivotably connected generally at its opposite ends with said jack portion and with the structural element respectively.

18. The container of claim 13 wherein the jack means comprises at least one hydraulic jack including a cylinder and an extendable and retractable rod, the folding link being pivotably connected to either the cylinder or rod portion of the jack while also being pivotably connected with the movable container element, the other portion of the hydraulic jack being pivotably connected with the structural element.

19. The container of claim 18 wherein the folding link comprises a rigid, elongated member pivotably connected generally at its ends with said jack portion and with the movable container element respectively.

20. The container of claim 13 wherein the jack means and folding link remain in slightly angled relation to each other when the jack means engages the bracket means to prevent overcenter motion of the jack means and folding link.

21. In a material handling machine of a type including a relatively fixed structural element, a movable element, motor means for effecting relative movement between the fixed element and movable element, a powered element and a jack means for operating the powered element, the jack means being adapted for compact arrangement within the material handling machine and for delayed operation following positioning of the movable element by the motor means, the combination comprising bracket means mounted upon the powered element, the jack means comprising a relatively fixed component and an extendable and retractable component, and
a folding link pivotably connected with one component of the jack means,
the other component of the jack means being pivotably connected with one of the fixed and movable elements, the folding link being pivotably connected with the other of the fixed and movable elements,
the jack means and folding link being extended toward a parallel alignment with each other and one component of the jack means entering into engagement with the bracket means as the movable element is shifted relative to the fixed element by the motor means in order to condition the jack means for subsequently operating the powered element.

22. The combination of claim 21 wherein the jack means is a hydraulic jack, the fixed component being a cylinder and the extendable and retractable component being a rod portion of the jack.

23. The combination of claim 22 wherein the folding link comprises a rigid, elongated member pivotably connected generally at its ends with one of the jack members and one of the fixed and movable elements.

24. The combination of claim 21 wherein the folding link comprises a rigid, elongated member pivotably connected generally at its ends with one of the jack components and one of the fixed and movable elements.

25. The combination of claim 21 wherein the movable element is arranged between the fixed structural element and the powered element.

26. The combination of claim 21 wherein the jack means and folding link remain in slightly angled relation to each other when the jack means engages the bracket means to prevent overcenter motion of the jack means and folding link.

* * * * *